United States Patent
Suzuki et al.

(10) Patent No.: US 6,829,887 B2
(45) Date of Patent: Dec. 14, 2004

(54) APPARATUS AND METHOD FOR CONTROLLING VEHICLE SO AS TO PURIFY EXHAUST EMISSION FROM ENGINE

(75) Inventors: Naoto Suzuki, Fujinomiya (JP); Makoto Yamazaki, Susono (JP); Takashi Suzuki, Susono (JP); Masaki Kusada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 153 days.

(21) Appl. No.: 10/025,693

(22) Filed: Dec. 26, 2001

(65) Prior Publication Data

US 2002/0092295 A1 Jul. 18, 2002

(30) Foreign Application Priority Data

Jan. 16, 2001 (JP) ........................................ 2001-007488
Feb. 20, 2001 (JP) ........................................ 2001-044131

(51) Int. Cl.$^7$ ................................................ F01N 3/00
(52) U.S. Cl. ............................. 60/284; 60/274; 60/285; 180/65.2
(58) Field of Search .......................... 60/274, 284, 285, 60/299; 180/65.2, 65.4

(56) References Cited

U.S. PATENT DOCUMENTS

| | | | | |
|---|---|---|---|---|
| 5,632,238 A | * | 5/1997 | Furukawa et al. | 123/179.3 |
| 5,801,499 A | * | 9/1998 | Tsuzuki et al. | 318/141 |
| 6,253,866 B1 | * | 7/2001 | Kojima | 180/65.2 |
| 6,266,956 B1 | * | 7/2001 | Suzuki et al. | 60/278 |
| 6,321,530 B1 | | 11/2001 | Hoshi et al. | |
| 6,370,871 B2 | * | 4/2002 | Suzuki et al. | 60/286 |
| 6,397,963 B1 | * | 6/2002 | Lennevi | 180/65.2 |

FOREIGN PATENT DOCUMENTS

| JP | A 58-67940 | 4/1983 |
|---|---|---|
| JP | A 11-210448 | 8/1999 |
| JP | A 2000-97063 | 4/2000 |
| JP | 2000-303828 | 10/2000 |

* cited by examiner

*Primary Examiner*—Thomas Denion
*Assistant Examiner*—Diem Tran
(74) *Attorney, Agent, or Firm*—Oliff & Berridge, PLC

(57) ABSTRACT

Method and apparatus for controlling a vehicle so as to purify an exhaust emission from an internal combustion engine with an exhaust-emission purifying catalyst disposed in an exhaust system of the engine, and such that the engine is brought into a temporary engine-stop state while a predetermined vehicle condition is satisfied, wherein the engine is operated for heating the catalyst, when a temperature of the catalyst has been lowered below a predetermined lower limit threshold, even while the predetermined vehicle condition is still satisfied. The catalyst maintains an exhaust-emission purifying ability at a temperature above the lower limit threshold. When the catalyst temperature has been raised to a predetermined upper limit threshold, as a result of the engine operation, the engine is restored to the temporary engine-stop state if the predetermined condition is still satisfied. The present method and apparatus permit the catalyst temperature to be held at a level higher than the activation lower limit, while minimizing the reduction of an effect of the temporary engine stop in an economy-running-system vehicle or a hybrid vehicle.

18 Claims, 4 Drawing Sheets

APPARATUS AND METHOD FOR CONTROLLING VEHICLE SO AS TO PURIFY EXHAUST EMISSION FROM ENGINE

INCORPORATION BY REFERENCE

The disclosure of Japanese Patent Application No. 2001-027488 filed on Jan. 16, 2001 and No. 2001-044131 filed on Feb. 20, 2001, including the specification, drawings and abstract, is incorporated herein by reference in its entirety.

BACKGROUND OF THE INVENTION

1. Field of Invention

The present invention relates to an apparatus and a method for controlling a vehicle such that an internal combustion engine of the vehicle is controlled so as to reduce harmful exhaust gas components to be emitted into the atmosphere.

2. Description of Related Art

Internal combustion engines (hereinafter referred to as "engine") of recent design for automotive or other vehicles are equipped in their exhaust system with a catalytic converter incorporating a catalyst such as a three-way catalyst, which is capable of inducing mutual reaction of harmful components NOx, HC and CO contained in an exhaust gas emission from the engines, to convert those harmful components into non-harmful components $N_2$, $CO_2$ and $H_2O$, for the purpose of preventing the harmful components from being released into the atmosphere, to meet a need of protecting the atmospheric environment. Such a catalyst (hereinafter referred to as "exhaust-emission purifying catalyst", where appropriate) for purifying the exhaust gas emission from the engines does not become active until the catalyst has been sufficiently warmed up by the exhaust gas up to a temperature not lower than a certain activation threshold. In a conventional automotive vehicle, the engine is inevitably operated with its catalyst held in a non-active state for some time immediately after the starting of the engine in a cold state to start running the vehicle. Usually, the engine is kept in the operated state once the vehicle running is started, so that a problem of the engine operation with its catalyst in its non-active state is encountered for only a relatively short time immediately after the starting of the vehicle running.

However, economy-running-system vehicles and hybrid vehicles are attracting more and more attention, in view of the recent growing requirement for saving fuel resources as well as the protection of the atmospheric environment. The economy-running-system vehicles are arranged to temporarily stop the engine upon stopping of the running vehicle due to stop signals or a traffic jam. The hybrid vehicles are adapted to selective use an engine and an electric motor as the drive power source, as needed depending upon the specific running condition of the vehicle. In these economy-running-system vehicle and hybrid vehicles, the engine may be temporarily stopped according to an economy-running control or hybrid control, before the exhaust-emission purifying catalyst has been sufficiently warmed up after the starting of the engine in a cold state. In this case, the warming-up of the exhaust-emission purifying catalyst is interrupted, leading to a risk of continued operation of the engine with the catalyst held in the cold non-active state. To solve this drawback with the economy-running system vehicles and hybrid vehicles, it has been proposed to inhibit the temporary stopping of the engine if the temperature of the exhaust-emission purifying catalyst has not been raised up to a predetermined lower limit, as disclosed in JP-A-58-67940 and JP-A-2000-97063.

According to the proposed described above, the exhaust-emission catalyst can be warmed up to a temperature not lower than the activation threshold, owing to the inhibition of the temporary stop of the engine until the catalyst has been sufficiently warmed up. Once the temperature of the catalyst has been raised to the activation threshold, however, the engine may be again temporarily stopped according to the economy-running control or hybrid control, and the temperature of the catalyst may be lowered down to the activation threshold, if the duration of the temporary stop of the engine is relatively long. Namely, there still exists a risk that the temporary stop of the engine for a long time causes a gradual drop of the catalyst temperature down to the activation threshold or lower.

There is also known HC-emission preventing means including an HC adsorbent which is accommodated in a container disposed upstream of the catalytic converter accommodated in another container, or accommodated in the container of the catalytic converter such that a layer of the HC adsorbent is superposed on a layer of the three-way catalyst. The HC adsorbent of the HC-emission preventing means temporarily adsorbs and holds HC to be emitted in a large amount immediately after the starting of the engine, until the exhaust-emission purifying catalyst has been sufficiently warmed up and become active. After the catalyst has become active as a result of the warming-up of the catalytic converter, the catalyst functions to remove the HC that is released due to a loss of the HC adsorption ability of the HC adsorbent which has been heated by the exhaust gas emitted from the engine. Where the temperature of the HC oxidizing catalyst is lowered to a point slightly lower than its activation threshold due to a temporary stop of the engine, subsequent re-starting of the engine may cause the temperature of the HC adsorbent of the HC-emission preventing means to become higher than an upper limit above which the HC adsorbent is not capable of adsorbing the HC, while the HC oxidizing catalyst is still in a non-active state. Thus, there may arise an undesirable situation in which both of the HC adsorbent and the HC oxidizing catalyst are both in the non-active state, causing the HC to be emitted into the atmosphere.

SUMMARY OF THE INVENTION

The present invention was made in view of the drawback discussed above. It is therefore a first object of the present invention to provide a method of controlling a vehicle, which is improved to minimize the above-described problems associated with a temporary stop of an engine of an economy-running-system vehicle or a hybrid vehicle and a consequent change of the temperature of an exhaust-emission purifying catalyst of the engine.

A second object of the invention is to provide an apparatus for controlling a vehicle, which is improved to minimize the problems indicated above.

The first object indicated above may be achieved according to a first aspect of the present invention, which provides a method of controlling a vehicle including an internal combustion engine such that the internal combustion engine is controlled so as to purify an exhaust emission from the internal combustion engine with an exhaust-emission purifying catalyst disposed in an exhaust system of the internal combustion engine, and such that the engine is brought into a temporary engine-stop state while a predetermined condition of the vehicle is satisfied, characterized in that the internal combustion engine is operated when a temperature of the exhaust-emission purifying catalyst has been lowered below a predetermined lower limit threshold, even while the predetermined condition of the vehicle is still satisfied, the catalyst maintaining an exhaust-emission purifying ability at a temperature above the predetermined lower limit threshold.

The second object indicated above may be achieved according to a second aspect of the invention, which provides an apparatus for controlling a vehicle including an internal combustion engine such that the internal combustion engine is controlled so as to purify an exhaust emission from the internal combustion engine with an exhaust-emission purifying catalyst disposed in an exhaust system of the engine, and such that the engine is brought into a temporary engine-stop state while a predetermined condition of the vehicle is satisfied, characterized by comprising a controller operable to operate the internal combustion engine when a temperature of the exhaust-emission purifying catalyst has been lowered below a predetermined lower limit threshold, even while the predetermined condition of the vehicle is still satisfied, the catalyst maintaining an exhaust-emission purifying ability at a temperature above the predetermined lower limit threshold.

The vehicle control method and apparatus of the present invention described above are arranged to operate the internal combustion engine, even while the predetermined condition of the vehicle is still satisfied, if the temperature of the exhaust-emission purifying catalyst has been lowered below the predetermined lower limit threshold above which the catalyst maintains the exhaust-emission purifying ability. According to the present vehicle control method and apparatus, therefore, the internal combustion engine is operated to prevent an excessive drop of the temperature of the catalyst due to the temporary stop of the engine according to the economy-running control or hybrid control, for thereby preventing a loss of the exhaust-emission purifying ability of the catalyst due to such an excessive temperature drop of the catalyst.

It is also noted, in particular, that the present vehicle control method and apparatus prevent the temperature drop of the exhaust-emission purifying catalyst slightly below the activation lower limit, it is possible to avoid an undesirable situation in which the exhaust-emission purifying catalyst and an HC adsorbent if used in combination of the catalyst are both unable to function.

BRIEF DESCRIPTION OF THE DRAWINGS

The above and other objects, features, advantages, and technical and industrial significance of this invention will be better understood by reading the following detailed description of a presently preferred embodiment of the invention, when considered in connection with the accompanying drawings, in which.

DETAILED DESCRIPTION OF PREFERRED EMBODIMENTS

Figure 1:
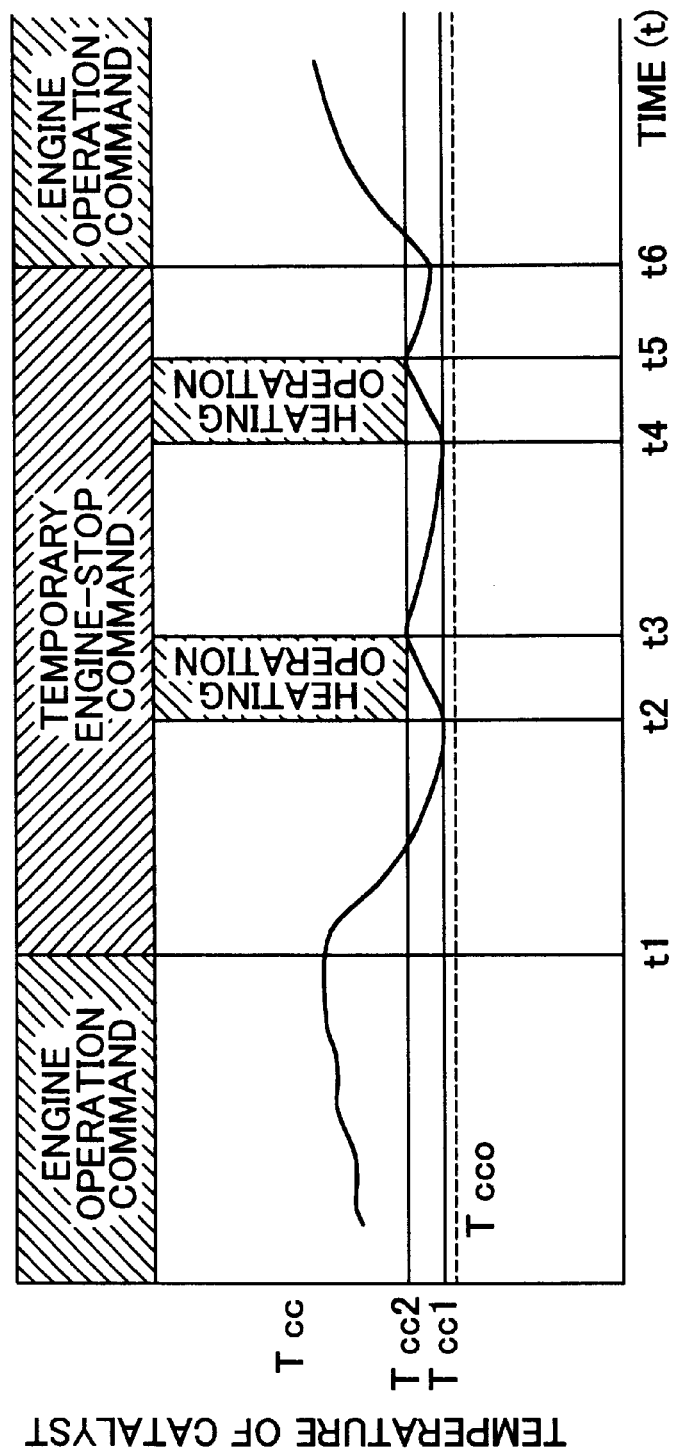
FIG. 1 is a diagrammatic time chart showing an example of a change of the temperature of a catalyst when a vehicle is controlled according to the principle of the present invention.
Figure 3:
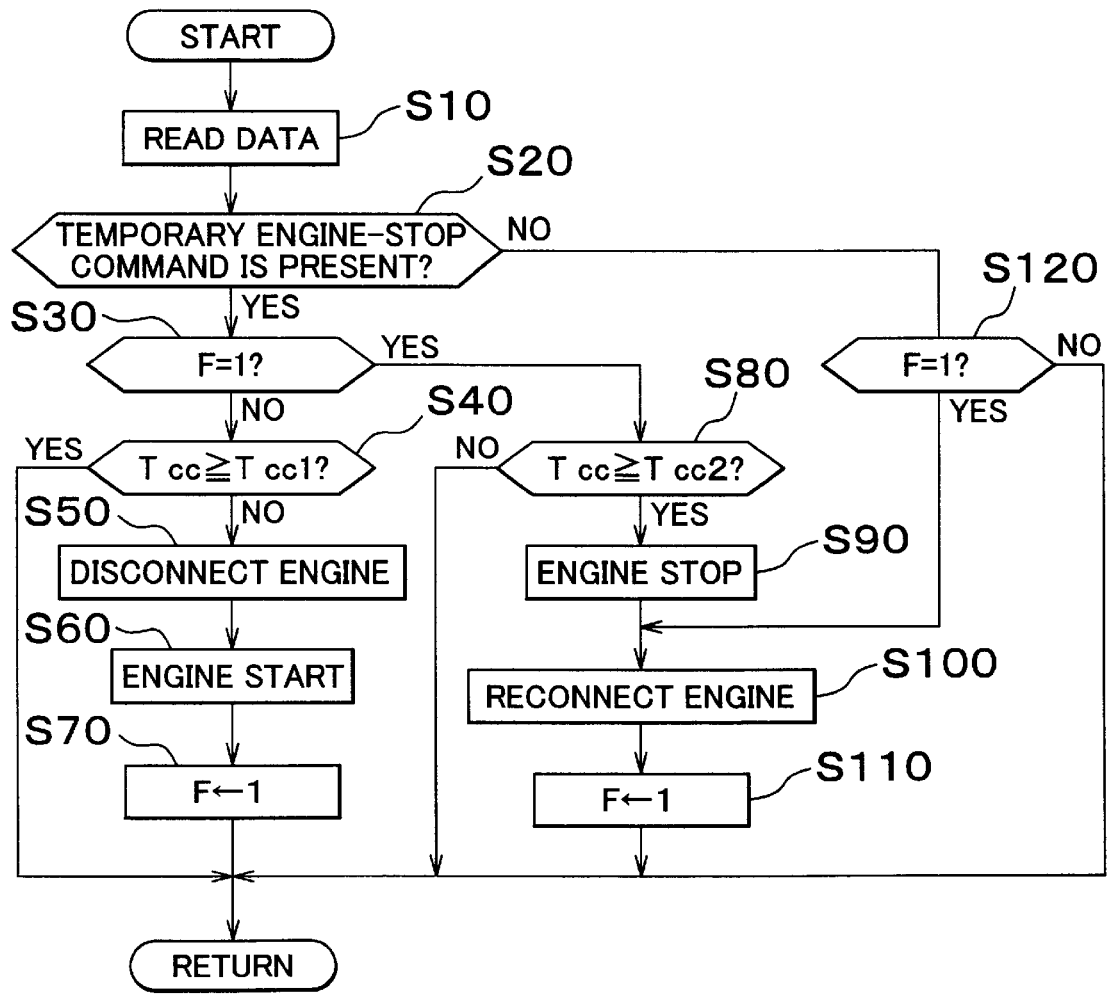
FIG. 3 is a flow chart illustrating an engine control routine for controlling the engine so as to purify the exhaust emission from the engine, according to one embodiment of a vehicle control apparatus of this invention.

Referring to the flow chart of FIG. 3, there is illustrated the engine control routine executed according to one embodiment of the present invention, to control an engine of an automotive vehicle for a time period between two points of time t2 and t4 and a time period between two points of time t4 and t6, during a running of the vehicle, as indicated in FIG. 1. This engine control routine is executed according to an engine control program which is stored, together with various other control programs, in a vehicle control apparatus including a microcomputer (not shown) well known in the art of controlling an economy-running-system vehicle or a hybrid vehicle. This engine control routine is initiated when the vehicle control apparatus is turned on.

Figure 4:
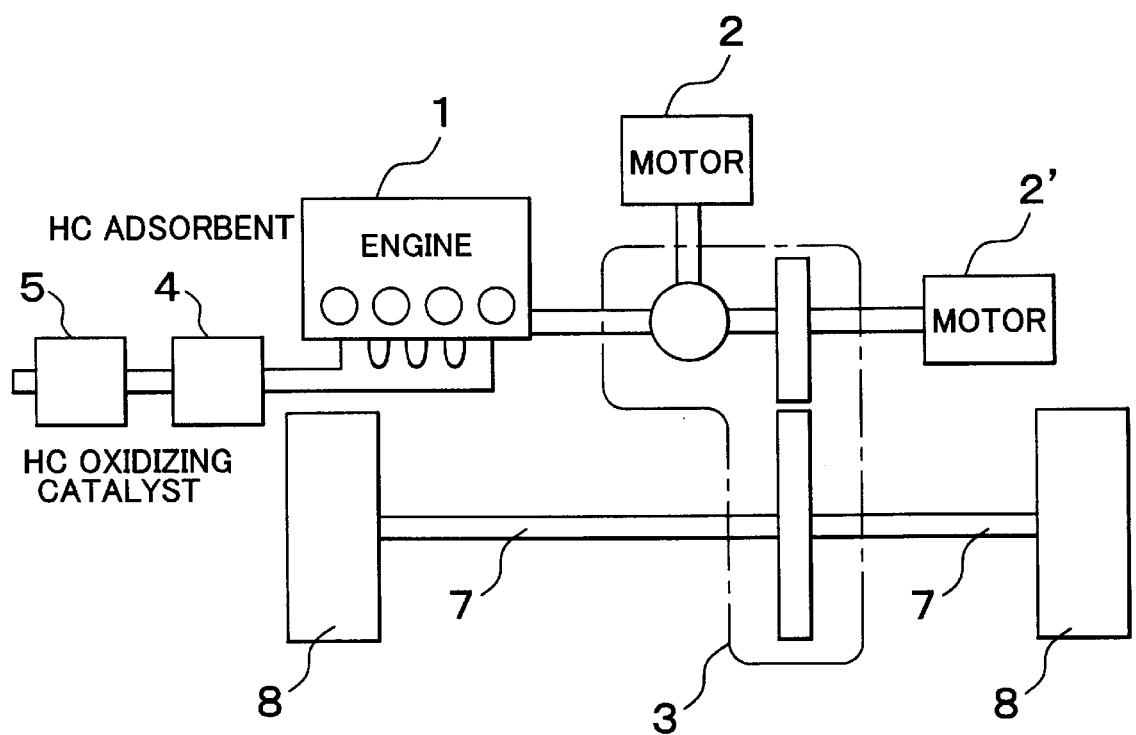
FIG. 4 is a schematic view of a hybrid vehicle to which one embodiment of the vehicle control apparatus is adopted.

As one example, a hybrid vehicle to which one embodiment of the vehicle control apparatus is adopted is schematically shown in FIG. 4. In this case, the hybrid vehicle has an internal combustion engine (hereinafter referred to as "engine") 1 and two electric motors 2 and 2'. A driving power of the engine and/or the electric motors 2, 2' is transmitted to a wheel 8 via a drive system 3 and a driveshaft 7. Here, the motor 2 mainly functions as an electric generator and the motor 2' mainly functions as an electric motor.

The engine control routine is initiated with step S10 to read in various kinds of data used to control the engine 1, such as an engine operation command and a temperature Tcc of the exhaust-emission purifying catalyst (HC oxidizing catalyst 5 is shown as the exhaust-emission purifying catalyst in FIG. 4). Then, step S20 is implemented to determine whether or not a temporary engine-stop command is present. If an affirmative decision (YES) is obtained in step S20, the control flow goes to step S30 to determine whether a flag F is set at "1". This flag is initially reset to "0" and is set to "1" in step S70 (described below), so that a negative decision (NO) is obtained in step S30 immediately after the initiation of the present routine, and the control flow goes to step S40.

Step S40 is provided to determine whether the temperature Tcc of the exhaust-emission purifying catalyst 5 is equal to or higher than a predetermined lower limit threshold Tcc1, which is slightly higher than an activation lower limit Tcc0 above which the catalyst 5 is active. If an affirmative decision (YES) is obtained in step S40, it indicates that a control of the engine 1 according to the present engine control routine is not presently necessary. In this case, the control flow immediately returns back to step S10 in which updated data are read in. If a negative decision (NO) is obtained in step S40, the control flow goes to step S50.

Step S50 is provided to disconnect the engine 1 from the other part of the drive system 3 (shown in FIG. 4), which includes a transmission. Step S50 is followed by step S60 to re-start the engine 1 so that the engine 1 is placed in an operating state. This engine operation while the temporary engine-stop command is present is effected not to produce a drive force for driving the vehicle, but to heat the exhaust-emission purifying catalyst 5 with the exhaust gas. In view of this purpose of this engine operation, the engine 1 is controlled with a delayed ignition timing, for maximizing a rise of the temperature of the exhaust gas while reducing the drive force. In this sense, the engine operation in the presence of the temporary engine-stop command is referred to as "heating operation of the engine", where appropriate. Then, the control flow goes to step S70 to set the flag F to "1", and returns back to step S10.

After step S70 is implemented, the flag F is set at "1", so that an affirmative decision (YES) is obtained in step S30, and the control flow goes to step S80 to determine whether the temperature Tcc is equal to or higher than a predetermined upper limit threshold Tcc2 which is determined to provide an optimum compromise between the frequency and time duration of the heating operation of the engine 1. If a negative decision (NO) is obtained in step S80, the control flow returns back to step S10. Thus, the heating operations of the engine 1 are effected during a time period between two points t2 and t4 and a time period between two points t4 and t5, as indicated in FIG. 1, by repeated implementation of steps S10, S20, S30 and S80.

When the temperature of the exhaust-emission purifying catalyst 5 has reached the upper limit threshold Tcc2 as a result of the heating operation of the engine 1 to heat the catalyst 5, an affirmative decision (YES) is obtained in step S80, and the control flow goes to step S90 to stop the engine 1, for restoring the engine 1 to the temporary engine-stop state. Step S100 is then implemented to re-connect the engine 1 to the other part of the drive system 3, that is, to cancel the disconnection of the engine 1 effected in step S50. Then, the control flow goes to step S110 to reset the flag F to "0".

When the temporary engine-stop command is removed at any point of time during the present engine control routine, a negative decision (NO) is obtained in step S20, and the control flow goes to step S120 to determine whether the flag is set at "1". If the engine 1 is in the heating operation to heat the catalyst 5, the flag F1 is set at "1". In this case, the control flow goes to step S100 to re-connect the engine 1 to the other part of the drive system 3, and to step S110 to reset the flag F to "0". When the engine 1 is in normal operation in the absence of the temporary engine-stop command, the negative decision (NO) is obtained in both of the steps S20 and S120. In this case, the heating operation of the engine 1 is not effected.

Referring to the diagrammatic time chart of FIG. 1, there will be described effects and advantages of the engine control routine according to the present embodiment which has been discussed above by reference to the flow chart of FIG. 3. In the example of FIG. 1, a temporary engine-stop command is generated to temporarily stop the engine at a point of time t1 according to the economy-running control or hybrid control when the vehicle is stopped at a traffic signal after starting of the vehicle with the engine 1 held in a cold state. Immediately before the point of time t1, the temperature of the exhaust-emission purifying catalyst such as a three-way catalyst 5 disposed in the exhaust system of the engine was in the process of a relatively slow rise, and the temperature at the point of time t1 is sufficiently higher than the activation lower limit Tcc0 above which the catalyst 5 is capable of performing its intended exhaust-emission purifying function.

However, the temporary stop of the engine 1 at the point of time t1 will initiate a drop of the temperature Tcc of the exhaust-emission purifying catalyst 5, and the continuation of the temporary stop of the engine 1 will cause the temperature Tcc to be gradually lowered down to a level close to the activation lower limit Tcc0. However, the present embodiment is arranged to initiate a heating operation of the engine 1 at the point of time t2, that is, when the temperature Tcc has been lowered to the predetermined lower limit threshold Tcc1 slightly higher than the activation lower limit Tcc0, even in the presence of the temporary engine-stop command, so that the engine 1 is operated for the purpose of maintaining the active state of the exhaust-emission purifying catalyst 5. This heating operation of the engine 1 for maintaining the catalyst 5 in the active state in the presence of the temporary engine-stop command is controlled by a suitable known engine control device (not shown), preferably in a manner suitable for heating the exhaust-emission purifying catalyst 5, that is, so as to effectively raise the temperature of the exhaust gas while restricting the drive force of the engine 1, for instance, by retarding the ignition timing of the engine 1.

During the heating operation of the engine 1, the temperature Tcc of the exhaust-emission purifying catalyst 5 rises to the upper limit threshold Tcc2 at a point of time t3 a certain time after the point of time t2. At this point of time t3, the engine 1 is restored to the temporary engine-stop state if the temporary engine-stop command is still present. By suitably selecting the upper limit threshold Tcc2 at which the heating operation of the engine 1 is terminated, it is possible to assure a sufficient effect of the economy-running control or hybrid control for protection of the atmospheric environment and saving of the fuel resources, by minimizing the heating operation of the engine 1 for heating the exhaust-emission purifying catalyst 5 in the presence of the temporary engine-stop command, while avoiding the non-active state of the catalyst 5. In the example of FIG. 3, the termination of the heating operation of the engine 1 at the point of time t3 causes a subsequent drop of the temperature Tcc of the catalyst 5, eventually down to the lower limit threshold Tcc1 at the point of time t4 at which the temporary engine-stop command is still present. Consequently, the heating operation of the engine 1 is again initiated at the point of time t4, and is terminated at a point of time t5 so that the engine 1 is restored to the temporary engine-stop state. The temporary stop is terminated to resume a normal operation of the engine 1 upon removal of the temporary engine-stop command at the point of time t6, namely, upon generation of a normal engine-operation command at the point of time t6.

Thus, the present engine control routine prevents a drop of the temperature Tcc of the exhaust-emission purifying catalyst 5, into a temperature range just below the activation lower limit Tcc0 above which the catalyst 5 remains in an active state.

Figure 2:
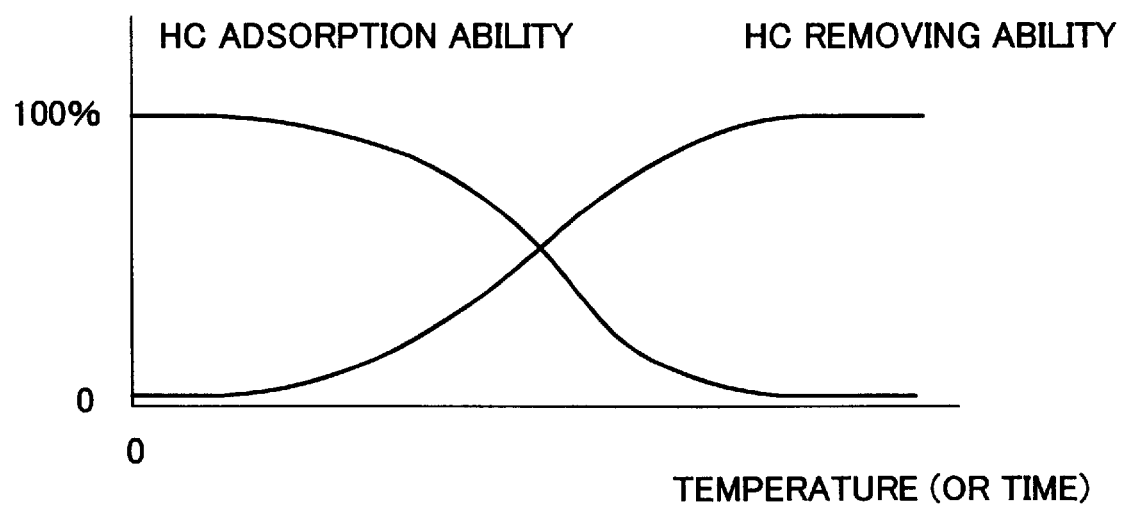
FIG. 2 is a graph showing changes of HC adsorption ability of an HC adsorbent and HC removing ability of an HC oxidizing catalyst such as a three-way catalyst, with the temperatures of the HC adsorbent and HC oxidizing catalyst, or with a time lapse after starting of the engine in a cold state.

The HC adsorption ability of an HC adsorbent 4 and the HC removing ability of the exhaust-emission purifying catalyst 5 (which is an HC oxidizing catalyst such as a three-way catalyst) change with a change of the temperatures of the HC adsorbent 4 and the catalyst 5, as shown in the graph of FIG. 2 in which the HC adsorption ability and HC removing ability are taken along the ordinate while the temperatures is taken along the abscissa. After the engine 1 is stated in a cold state, the HC adsorbent 4 and the HC oxidizing catalyst 5 are heated by the exhaust gas emitted from the engine 1, and their temperatures are gradually raised with the time. Therefore, the temperatures taken along the abscissa in the graph of FIG. 2 may be replaced by the time which has passed after the starting of the engine 1 in the cold sate. As is apparent from the graph, the HC adsorption ability of the HC adsorbent 4 decreases with the temperature or time while the HC removing ability of the HC oxidizing catalyst 5 increases with the temperature or time. These decrease and increase of the HC adsorption ability and HC removing ability are represented by respective curves, which intersect each other at a given temperature or at a given point of time, as indicated in FIG. 2. Within a temperature range which includes a temperature corresponding to the point of intersection of the two curves and the upper and lower limits of which are slightly lower and higher than the temperature corresponding to the intersection point, the HC adsorption ability of the HC adsorbent 4 to adsorb the HC is not sufficiently high, while at the same time the HC removing ability of the HC oxidizing catalyst 5 to remove the HC released from the HC adsorbent 4 is not yet sufficiently high, either. The upper limit of the above-indicated temperature range is defined by the activation lower limit Tcc0 of the exhaust-emission purifying catalyst 5 (HC oxidizing catalyst 5). The temperature of the catalyst 5 is required to pass this temperature range and exceed the activation lower limit Tcc0, in a short time after starting of the engine 1 in a cold state, and should not be lowered back into this range after it has been raised above the activation lower limit Tcc0. The principle of the present invention lies in the prevention of the temperature drop back into the above-indicated temperature range during the temporary stop of the engine 1.

The frequency of the heating operation of the engine 1 for maintaining the temperature of the exhaust-emission purifying catalyst 5 at a level higher than the activation lower limit Tcc0 (lower limit threshold Tcc1) in the presence of the temporary engine-stop command decreases with an increase of the upper limit threshold Tcc2 at which the heating operation of the engine 1 (which has been initiated when the temperature Tcc of the catalyst 5 has been lowered to the lower limit threshold Tcc1) is terminated. On the other hand, the effect of the economy-running control or hybrid control decreases to a large extent with the increase of the upper limit threshold Tcc2. In this respect, the lower limit threshold Tcc1 and the upper limit threshold Tcc2 are determined so as to provide a maximum overall result relating to the purification of the exhaust emission of the engine 1 and the saving of the fuel resources, that is, so as to provide an optimum compromise between the two mutually incompatible requirements, that is, an expected effect of the heating operation of the engine 1 and an expected effect of the economy-running control or hybrid control.

The duration of the heating operation of the engine 1 for heating the exhaust-emission purifying catalyst 5 in the presence of the temporary engine-stop command under a predetermined condition of the vehicle can be shortened by controlling the heating operation of the engine 1 so as to effectively heat the catalyst 5, by retarding the ignition timing, for instance. That is, the time period between the points of time t2 and t3 and the time period between the points of time t4 and t5 can be shortened by controlling the heating operation of the engine 1 as described above, minimizing the amount of reduction of the effect of the economy-running control or hybrid control due to the heating operation of the engine 1 to maintain the catalyst 5 in the active state.

While the presently preferred embodiment of this invention has been described by reference to the accompanying drawings, it is to be understood that the invention is not limited to the details of the preferred embodiment. To the contrary, the invention is intended to cover various modifications and equivalent arrangements. In addition, while the various elements of the preferred embodiment are shown in various combinations and configurations, which are exemplary, other combinations and configurations, including more, less or only a single element, are also within the spirit and scope of the invention.

What is claimed is:

1. A method of controlling a vehicle including an internal combustion engine such that the internal combustion is controlled so as to purify an exhaust emission from the internal combustion engine with an exhaust-emission purifying catalyst disposed in an exhaust system of the internal combustion engine, and such that the internal combustion engine is brought into a temporary engine-stop state while a predetermined condition of the vehicle is satisfied, said method comprising the steps of:

detecting a temperature of said exhaust-emission purifying catalyst;

operating the internal combustion engine when the detected temperature of the exhaust-emission purifying catalyst has been lowered below a predetermined lower limit threshold, even while said predetermined condition of the vehicle is still satisfied, the catalyst maintaining an exhaust-emission purifying ability at a temperature above said predetermined lower limit threshold; and restoring the internal combustion engine to the temporary engine-stop state if the predetermined condition of the vehicle is still satisfied, when the temperature of the exhaust-emission purifying catalyst has been raised to a predetermined upper limit threshold higher than the lower limit threshold, the upper limit threshold providing a compromise between the frequency and time duration of the heating to occur as a result of the operation of the internal combustion engine while said predetermined condition of the vehicle is satisfied; and wherein the operation of the internal combustion engine while said predetermined condition of the vehicle is satisfied is controlled so as to effectively heat said exhaust-emission purifying catalyst.

2. A method according to claim 1, wherein the operation of the internal combustion engine while said predetermined condition of the vehicle is satisfied is controlled so as to effectively heat said exhaust-emission purifying catalyst.

3. A method according to claim 2, wherein that the operation of the internal combustion engine while said predetermined condition of the vehicle is satisfied is effected with a delayed ignition timing of the engine, to promote the heating of the exhaust-emission purifying catalyst.

4. A method according to claim 2, wherein said vehicle is an economy-running-system vehicle or a hybrid vehicle.

5. A method according to claim 1, wherein said vehicle is an economy-running-system vehicle or a hybrid vehicle.

6. A method according to claim 1, wherein the operation of the internal combustion engine while said predetermined condition of the vehicle is satisfied is controlled so as to effectively heat said exhaust-emission purifying catalyst.

7. A method according to claim 6, wherein that the operation of the internal combustion engine while said predetermined condition of the vehicle is satisfied is effected with a delayed ignition timing of the engine, to promote the heating of the exhaust-emission purifying catalyst.

8. A method according to claim 6, wherein said vehicle is an economy-running-system vehicle or a hybrid vehicle.

9. A method according to claim 1, wherein said vehicle is an economy-running-system vehicle or a hybrid vehicle.

10. An apparatus for controlling a vehicle including an internal combustion engine such that the internal combustion engine is controlled so as to purify an exhaust emission from the internal combustion engine with an exhaust-emission purifying catalyst disposed in an exhaust system of the internal combustion engine, and such that the internal combustion engine is brought into a temporary engine-stop state while a predetermined condition of the vehicle is satisfied, said apparatus comprising a controller operable to operate the internal combustion engine when a temperature of the exhaust-emission purifying catalyst has been lowered below a predetermined lower limit threshold (Tcc1), even while said predetermined condition of the vehicle is still satisfied, the catalyst maintaining an exhaust-emission purifying ability at a temperature above said predetermined lower limit threshold; and wherein said controller is operable to restore the internal combustion engine to said temporary engine-stop state if said predetermined condition of the vehicle is still satisfied, when the temperature of the exhaust-emission purifying catalyst has been raised to a predetermined upper limit threshold (Tcc2) higher than the lower limit threshold (Tcc1), the upper limit threshold providing a compromise between the frequency and time duration of the heating to occur as a result of the operation of the internal combustion engine while the predetermined condition of the vehicle is satisfied; and wherein said controller is operable to control the operation of the internal combustion engine while said predetermined condition of the vehicle is satisfied, such that the operation of the internal combustion engine is effective to heat said exhaust-emission purifying catalyst.

11. An apparatus according to claim 10, wherein said controller is operable to control the operation of the internal combustion engine while said predetermined condition of the vehicle is satisfied, such that the operation of the internal combustion engine is effective to heat said exhaust-emission purifying catalyst.

12. An apparatus according to claim 11, wherein said controller is operable to control the operation of the internal combustion engine while said predetermined condition of the vehicle is satisfied, such that the internal combustion engine is operated with a delayed ignition timing, to promote the heating of the exhaust-emission purifying catalyst.

13. An apparatus according to claim 10, wherein said controller is operable to control the operation of the internal combustion engine while said predetermined condition of the vehicle is satisfied, such that the operation of the internal combustion engine is effective to heat said exhaust-emission purifying catalyst.

14. An apparatus according to claim 13, wherein said controller is operable to control the operation of the internal combustion engine while said predetermined condition of the vehicle is satisfied, such that the internal combustion engine is operated with a delayed timing, to promote the heating of the exhaust-emission purifying catalyst.

15. An economy-running-system vehicle provided with an apparatus according to claim 10.

16. An economy-running-system vehicle provided with an apparatus for controlling a vehicle including an internal combustion engine such that the internal combustion engine is controlled so as to purify an exhaust emission from the internal combustion engine with an exhaust-emission purifying catalyst disposed in an exhaust system of the internal combustion engine, and such that the internal combustion engine is brought into a temporary engine-stop state while a predetermined condition of the vehicle is satisfied, said apparatus comprising a controller operable to operate the internal combustion engine when a temperature of the exhaust-emission purifying catalyst has been lowered below a predetermined lower limit threshold (Tcc1), even while said predetermined condition of the vehicle is still satisfied, the catalyst maintaining an exhaust-emission purifying ability at a temperature above said predetermined lower limit threshold;

wherein said apparatus comprises the controller as recited in claim 10.

17. A hybrid vehicle provided with an apparatus according to claim 10.

18. A hybrid vehicle provided with an apparatus for controlling a vehicle including an internal combustion engine such that the internal combustion engine is controlled so as to purify an exhaust emission from the internal combustion engine with an exhaust-emission purifying catalyst disposed in an exhaust system of the internal combustion engine, and such that the internal combustion engine is brought into a temporary engine-stop state while a predetermined condition of the vehicle is satisfied, said apparatus comprising a controller operable to operate the internal combustion engine when a temperature of the exhaust-emission purifying catalyst has been lowered below a predetermined lower limit threshold (Tcc1), even while said predetermined condition of the vehicle is still satisfied, the catalyst maintaining an exhaust-emission purifying ability at a temperature above said predetermined lower limit threshold;

wherein said apparatus comprises the controller as recited in claim 10.

* * * * *